No. 682,968. Patented Sept. 17, 1901.
A. ANZELEWITZ.
WINDING AND SETTING MECHANISM FOR WATCHES.
(Application filed Dec. 6, 1900.)
(No Model.) 2 Sheets—Sheet 1.
Fig. 1.
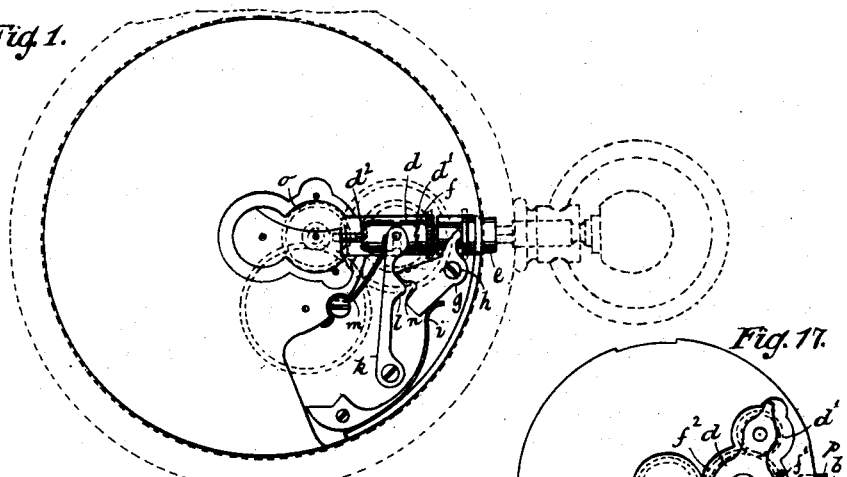
Fig. 17.
Fig. 2.
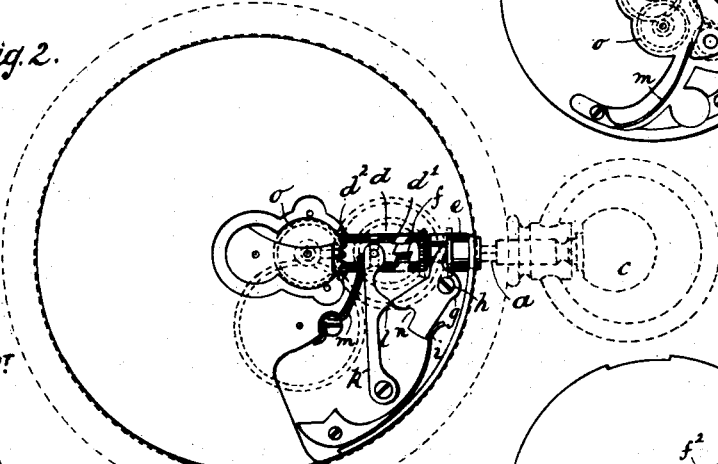
Fig. 18.
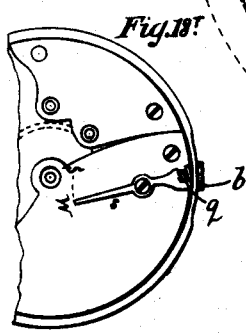
Fig. 3.
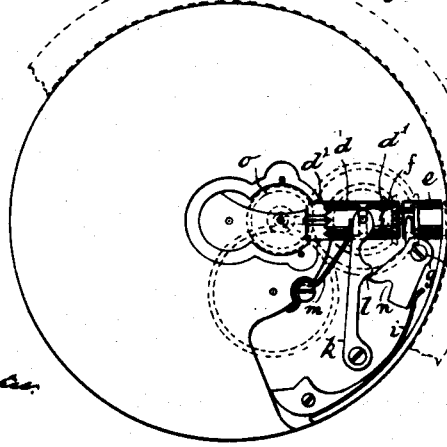
WITNESSES:
E. Wolff
C. E. Bengler
INVENTOR:
Abraham Anzelewitz.
BY
Hauff & Hauff
ATTORNEYS.

No. 682,968. Patented Sept. 17, 1901.
A. ANZELEWITZ.
WINDING AND SETTING MECHANISM FOR WATCHES.
(Application filed Dec. 6, 1900.)
(No Model.) 2 Sheets—Sheet 2.
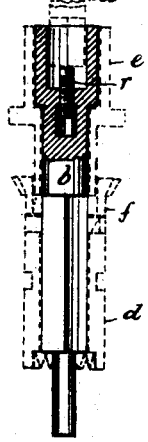
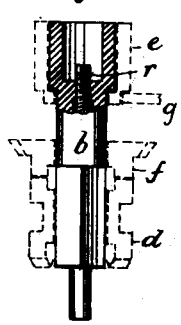
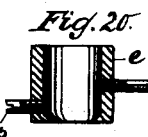
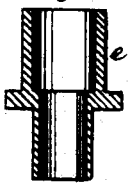
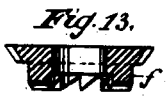
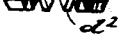
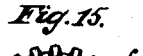
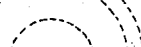
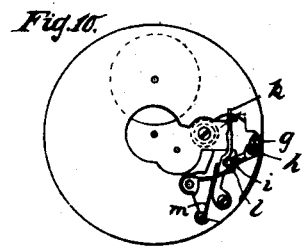
WITNESSES:
E. Wolff
INVENTOR:
Abraham Anzelewitz.
BY
Hauff & Hauff
ATTORNEYS.

UNITED STATES PATENT OFFICE.

ABRAHAM ANZELEWITZ, OF NEW YORK, N. Y.

WINDING AND SETTING MECHANISM FOR WATCHES.

SPECIFICATION forming part of Letters Patent No. 682,968, dated September 17, 1901.

Application filed December 6, 1900. Serial No. 38,897. (No model.)

*To all whom it may concern:*

Be it known that I, ABRAHAM ANZELEWITZ, a citizen of the United States, residing at Manhattan borough, New York city, in the county and State of New York, have invented new and useful Improvements in Winding and Setting Mechanism for Watches, of which the following is a specification.

This invention resides in certain novel details of construction set forth in the following specification and claims, and illustrated in the annexed drawings, in which—

Figure 1 shows the mechanism in winding position as it would be when the works are out of the case or when the stem is loosened in or being withdrawn from the case. Fig. 2 shows the works and stem secured in the case and the stem drawn or snapped outward to setting position. Fig. 3 shows the stem pushed in for winding. Fig. 4 shows an arbor. Fig. 5 shows a shell. Fig. 6 shows a winding transmission-gear. Fig. 7 shows the clutch-sleeve. Fig. 8 is an inverted plan view of said clutch-sleeve, with the gear or circumference of Fig. 6 projecting beyond the same. Fig. 9 shows the appearance of a stem and arbor as appearing together in a case. Fig. 10 shows a lever and arm forming part of the winding and setting mechanism. Figs. 11 to 16 likewise show an arbor, a shell, a winding transmission-gear, and a winding and setting pinion, the shell being somewhat modified, as seen by comparing Fig. 12 with Fig. 5. Fig. 17 shows the winding and setting pinions carried by a yoke instead of a sleeve, as in Fig. 7, and with the parts in winding position, as when the works are out of the case. Fig. 18 is a view like Fig. 17 with the parts in setting position. Fig. 18* shows a lock by which the mechanism can be held in a certain position—as, for example, setting. Figs. 19 to 21 show the arbor, shell, and transmission-gear which can be used in connection with the yoke of Fig. 17. Fig. 22 is a plan view of the transmission-gear shown in Fig. 21 in sectional side elevation.

The dotted lines in Figs. 4 and 11 indicate the location of the parts of Figs. 5 to 7 and 12 to 14 when assembled on their respective arbors. The shells $d$, as indicated by the square holes shown in Figs. 8 and 16, have a non-circular engagement with the arbor, so as to turn therewith.

In the drawings are shown a stem $a$ and an arbor $b$, the stem having the crown or button $c$ for rotating, as also for the push and pull to effect the longitudinal motion or the moving or snapping of the mechanism into setting and winding position. The terms "stem" and "arbor" are convenient for description; but as a matter of fact one of these parts can be considered in reality a continuation or portion of the other and the stem and arbor could be screwed or secured together or formed as one. The construction shown has, however, been found satisfactory in practice, the arbor having a head or seat of square or non-circular form for engagement by the correspondingly-shaped stem, so that the rotation of the crown and stem is transmitted to the arbor. With this arbor or stem is combined a sliding clutch-sleeve $d$, seated about or rotated by the arbor and having the winding-teeth $d'$ and setting-teeth $d^2$. The winding-teeth, as usual, are shaped on the incline, or, rather, with one face inclined, so that when rotated back and forth they slip in one direction, but take hold when turning in the winding direction, as customary in stem-winding timepieces. The setting-teeth $d^2$ are of the customary gear-teeth form, or so made as to take hold in either direction for setting backward and forward. The sleeve $d$ can be formed of one piece with teeth $d'\ d^2$, and was so made in a device constructed according to this invention. A shell $e$ is made separate from and seated about the arbor, and the winding transmission-gear $f$ has its under face provided with teeth corresponding to or made to engage the winding-teeth of sleeve $d$. The circumferential teeth of gear or pinion $f$ engage the transmission-gear, which engages the winding-gear of the mainspring or drum. The shell $e$ engages a lever $g$, or, rather, one arm of said lever, which is shown with fulcrum $h$. A spring $i$ tends to hold this lever against the shell or a suitable flange or shoulder of this shell. An arm $k$ is made to carry sleeve $d$ respectively into and out of action—that is, out of winding into setting position, and conversely. This arm $k$, or, rather, its nose or part $l$, is engaged by lever $g$. Spring $m$ holds or moves the arm to the lever. Say the works are out of the case or the stem screwed loose from the case. Then the stem exerts no pressure on the arbor and the arbor exerts no pressure on the shell $e$. The latter is then moved by lever $g$, under the action of spring $i$, in an outward direction or away from arm $k$, and the latter has its nose $l$ correspond with the cut $n$ in the inner arm or flat part of lever $g$. The arm $k$, actuated by spring $m$, moving or swinging arm $k$ outward, will hold the winding-gear in engagement with the gear $f$. The parts being in winding position setting or regulation can be suitably attended to before the works are put in the case or the stem secured in the case, the setting-train not being connected to or dragging on the going power to interfere with the setting or regulating. When the movement or works are in the case and the stem or arbor holds lever $g$ in position to act against or hold arm $k$ so that sleeve $d$ is free from the winding-gear, but in engagement with the setting-gear $o$, the rotation of the stem, as required, will set the hands back or forward. When the stem is pushed or snapped in, so as to carry lever $g$ to one side of or free arm $k$, the latter again moves to winding position or holds the winding-teeth $d'$ in action. For short, it may be said that when lever $g$ is at either extreme of its throw the mechanism is in winding position, as seen in Figs. 1 and 3. When in intermediate position, as seen in Fig. 2, the lever holds the winding-gear out of action and the setting gear or teeth in action. The works can thus be inserted into any case provided with any sort of stem—that is, if the stem is made to snap in and out between the limits shown in Figs. 2 and 1 the stem when inward, Fig. 2, will effect setting position and when out, Fig. 1, winding position. If, on the other hand, the stem moves between the limits shown in Figs. 2 and 3, the stem when in will effect winding and when out setting position. In place of having the winding and setting gear carrier in form of a sleeve it might be in the form of the well-known yoke $d$, Fig. 17, which under the action of spring $m$ holds gear $d'$ normally in and setting-gear $d^2$ normally out of action, and the shell $e$, having a screw or pin $p$ projecting to engagement with lever $g$, can be made to swing the latter to and from shoulder $l$. As the lever swings to one side or another, or to right or left of the yoke-shoulder $l$, the parts are in winding position the same as the parts in Figs. 1 and 3; but if the lever sits against the yoke-shoulder, as seen in Fig. 18, the parts are in winding position. The rotation of the gears $d'$ $d^2$ of the yoke of Fig. 17 is effected by the intermediate gear $f^2$, engaged by the gear $f'$, Fig. 21, on the arbor shown in Fig. 19; but this feature is common. The arbor of Fig. 19 of course has the usual angular or non-circular connection with the gear of Fig. 21, so as to rotate the latter. A pin $q$ can be made to rotatably connect shell $e$ to arbor $b$, suitably grooved to form a race or channel for the rotation of the pin. If engaged by the end of a lever $g$, as in Fig. 1, the shell $e$ can have a flange which the lever end can sit against or straddle, and the shell can extend below this flange or not. The gear $f$ can be seated either about the lower extension of the shell $e$ or directly about the arbor. The stem and arbor when of separate pieces can be held in proper relative position or prevented from excessive telescoping by an adjusting-screw $r$ therefor. If the stem and arbor need no adjustment or are secured together or formed practically of one piece, the screw $r$ can be omitted. The screw or pin $q$ can be engaged or locked by the fork or an arm of hand or lever $s$ on an outside frame-plate of the movement to hold the arbor inward, as thereby the placing of the works into and removal from the case is facilitated. Suitable lettering or indication can be provided to show whether hand $s$ holds the parts in setting or winding position. By suitable indication on the plate, such as "S" and "W," for "setting" and "winding," it can be noticed how the hand $q$ and the mechanism are placed. The lever $g$ can be of various forms, either with a flat or fan-tailed arm with cut $n$, as in Fig. 1, or with a thin arm, as in Figs. 10 and 17, swinging to and from the hump $l$.

Such modifications as transposing the hump $l$ and cut $n$, Fig. 1, so that the cut or depression is in the arm $k$ and the arm is moved back or allowed to come forward as the lever $g$ moves into and out of this depression are obvious to watchmakers and need not be discussed in detail, as they are included in this invention.

What I claim as new, and desire to secure by Letters Patent, is—

1. In a winding and setting mechanism, a stem, a shell carried on the stem, a sliding clutch-sleeve on the stem, and two engaging spring-actuated levers; one of them engaging the shell and the other one serving to shift the clutch-sleeve, and the lever that shifts the clutch-sleeve being positively held in one of its positions by the other lever.

2. In a winding and setting mechanism the combination with a stem, an arbor, and an adjusting-screw for the stem and arbor, of a winding and setting pinion, a shell separate from and seated about said arbor, a lever engaged by the shell, and an arm engaged by the lever and made to carry the winding and setting pinion or gear respectively into and out of action substantially as described.

3. In a winding and setting mechanism, a stem, a shell carried by the stem, a sliding clutch-sleeve on the stem, two engaging spring-actuated levers, one of them engaging the shell and the other one serving to shift the clutch-sleeve, and the lever that shifts the clutch-sleeve being positively held in one of its positions by the other lever, a pin connected with the shell, and a locking device for engaging said pin.

In testimony whereof I have hereunto set my hand in the presence of two subscribing witnesses.

A. ANZELEWITZ.

Witnesses:
W. C. HAUFF,
CHAS. E. POENSGEN.